US011976515B2

United States Patent
(12) United States Patent
Fan et al.

(10) Patent No.: US 11,976,515 B2
(45) Date of Patent: May 7, 2024

(54) TELESCOPIC BABY SAFETY DOOR BARRIER AND AUXILIARY MOUNTING DEVICE

(71) Applicant: SHENZHEN ROOT INNOVATION TECHNOLOGY CO., LTD., Shenzhen (CN)

(72) Inventors: Mingfeng Fan, Shenzhen (CN); Ruibin Gao, Shenzhen (CN)

(73) Assignee: SHENZHEN ROOT INNOVATION TECHNOLOGY CO., LTD., Shenzhen (CN)

( * ) Notice: Subject to any disclaimer, the term of this patent is extended or adjusted under 35 U.S.C. 154(b) by 103 days.

(21) Appl. No.: 17/489,804

(22) Filed: Sep. 30, 2021

(65) Prior Publication Data

US 2022/0268096 A1 Aug. 25, 2022

(30) Foreign Application Priority Data

Feb. 19, 2021 (CN) ......................... 202120380509.9

(51) Int. Cl.
*E06B 9/08* (2006.01)
*E06B 9/00* (2006.01)

(52) U.S. Cl.
CPC .......... *E06B 9/08* (2013.01); *E06B 2009/002* (2013.01)

(58) Field of Classification Search
CPC ........... E06B 2009/002; E06B 2009/08; E06B 11/02; A47D 13/00; F16M 13/02
USPC ................................ 248/244, 295.11, 297.21
See application file for complete search history.

(56) References Cited

U.S. PATENT DOCUMENTS 1,933,719 A * 11/1933 Dilg ....................... A47H 1/122 248/265
3,430,908 A * 3/1969 Kowalczyk ............ A47H 1/102 248/265
4,113,538 A * 9/1978 Green ..................... B65C 1/025 156/247
4,179,091 A * 12/1979 Bidney .................. A47H 1/144 248/265
4,363,459 A * 12/1982 Holzer .................... E06B 9/323 248/265
(Continued)

FOREIGN PATENT DOCUMENTS

WO WO-2016137541 A1 * 9/2016 ............... E06B 9/02

*Primary Examiner* — Abe Massad
(74) *Attorney, Agent, or Firm* — Bayramoglu Law Offices LLC

(57) ABSTRACT

A telescopic baby safety door barrier and an auxiliary mounting device are provided. The telescopic baby safety door barrier includes a door barrier main body, wherein the door barrier main body is provided with a mounting portion; a connecting hole is formed in the mounting portion; and the mounting portion is provided with a double faced adhesive tape. When the telescopic baby safety door barrier is mounted necessarily, only the mounting portion is adhered to a wall by the double faced adhesive tape, holes are then punched through the connecting hole, and screws are then mounted, thereby being convenient in mounting. The auxiliary mounting device includes a base provided with a sliding groove and a mounting jig slidably disposed in the sliding groove, and a first adjustment assembly for fixing the mounting jig is disposed between the mounting jig and the base.

9 Claims, 5 Drawing Sheets

(56) References Cited

U.S. PATENT DOCUMENTS

| | | | | | |
|---|---|---|---|---|---|
| 4,607,455 | A * | 8/1986 | Bluem | E06B 11/02 | 49/55 |
| 4,671,012 | A * | 6/1987 | Merklinger | E06B 3/68 | 49/55 |
| 4,677,791 | A * | 7/1987 | Larson | E06B 9/02 | 49/55 |
| 5,275,221 | A * | 1/1994 | Doehlemann | E04F 10/02 | 160/84.04 |
| 8,191,604 | B2 * | 6/2012 | Wang | E06B 9/0692 | 160/293.1 |
| 8,196,348 | B2 * | 6/2012 | Flannery | E06B 9/04 | 49/55 |
| 8,881,787 | B2 * | 11/2014 | Wang | E06B 11/04 | 160/24 |
| D999,220 | S * | 9/2023 | Hung | D14/457 | |
| 2004/0137182 | A1 * | 7/2004 | Messier | B42F 3/006 | 428/40.1 |
| 2007/0084617 | A1 * | 4/2007 | Dinh | H02G 3/125 | 174/58 |
| 2007/0192942 | A1 * | 8/2007 | Anh | A42B 1/06 | 1/6 |
| 2010/0307700 | A1 * | 12/2010 | Wang | E06B 9/0692 | 160/264 |
| 2018/0148954 | A1 * | 5/2018 | Raffi | E05B 59/00 | |
| 2020/0252023 | A1 * | 8/2020 | Stearns | F16M 13/02 | |
| 2020/0355024 | A1 * | 11/2020 | Katcher | E06B 9/78 | |
| 2021/0355751 | A1 * | 11/2021 | Liang | E06B 9/60 | |

* cited by examiner

TELESCOPIC BABY SAFETY DOOR BARRIER AND AUXILIARY MOUNTING DEVICE

CROSS REFERENCES TO THE RELATED APPLICATIONS

This application is based upon and claims priority to Chinese Patent Application No. 202120380509.9, filed on Feb. 19, 2021, the entire contents of which are incorporated herein by reference.

TECHNICAL FIELD

The utility model relates to the technical field of telescopic baby safety door barriers, and more particularly, to a telescopic baby safety door barrier and an auxiliary mounting device.

BACKGROUND

Baby safety door barriers can help babies move within safety areas and prevent them from accidental injuries such as falling down from stairs, scalding in kitchens or drowning in bathrooms.

Presently, when mounted, the baby safety door barrier is typically fixed on the wall of the room by screws for the purpose of improving the structural strength of the door barrier and preventing the collapse in use. Hence, prior to mounting, holes are punched necessarily on the wall so as to facilitate the mounting of the screws. However, due to the overall large length of the door barrier, it is hard for the holes punched on the wall to be in one-to-one correspondence with the mounting holes on the door barrier, which makes the mounting of the door barrier very troublesome.

SUMMARY

An objective of the utility model is to overcome the shortage of the prior art, and provide a telescopic baby safety door barrier, to solve the technical problem of the very troublesome mounting of the existing telescopic baby safety door barrier on the wall.

To solve the above-mentioned technical problem, the utility model uses the following technical solutions:

A telescopic baby safety door barrier and an auxiliary mounting device include a door barrier main body; the door barrier main body is provided with a mounting portion; a connecting hole is formed in the mounting portion; and the mounting portion is provided with a double faced adhesive tape.

Further, the door barrier main body includes a hollow doorpost and a telescopic barrier disposed in the doorpost; the doorpost is provided with an opening; and one end of the telescopic barrier is protruded out of the opening.

Further, an end, away from the doorpost, of the telescopic barrier is provided with a connecting buckle.

Further, a through hole is formed in the double faced adhesive tape, and when the double faced adhesive tape is connected to the mounting portion, the through hole is opposite to the connecting hole; and an anti-adhesion layer is adhered at an outer side of the double faced adhesive tape.

Another objective of the utility model is to overcome the shortage of the prior art, and provide a telescopic baby safety door barrier and an auxiliary mounting device, to solve the technical problem of the very troublesome mounting of the existing telescopic baby safety door barrier on the wall.

To solve the above-mentioned technical problem, the utility model uses the following technical solutions.

An auxiliary mounting device includes:

a base, provided with a sliding groove; and a mounting jig, slidably disposed in the sliding groove.

A first adjustment assembly for fixing the mounting jig is disposed between the mounting jig and the base.

Further, the base is provided with a first strip-shaped sliding hole; the first strip-shaped sliding hole communicates with the sliding groove; the first adjustment assembly includes an adjustment rod and a lock member; one end of the adjustment rod is connected to the mounting jig, and the other end of the adjustment rod is protruded out of the first strip-shaped sliding hole; the adjustment rod is in sliding fit with the first strip-shaped sliding hole; the lock member is in threaded connection with the adjustment rod; and by rotating the lock member, the lock member is abutted against the base.

Further, at least two locating posts are in sliding fit on the mounting jig, and a second adjustment assembly for fixing the locating post is disposed between the locating post and the mounting jig.

Further, the mounting jig is provided with a second strip-shaped sliding hole, and the locating post is slidably disposed in the second strip-shaped sliding hole; the second adjustment assembly includes a first adjustment member and a second adjustment member that are in threaded connection with the locating post; the first adjustment member and the second adjustment member are respectively located at two sides of the mounting jig; and the first adjustment member and the second adjustment member are in abutment fit with the mounting jig.

Further, a side, close to the base, of the mounting jig is provided with an accommodation groove; the second adjustment member is located in the accommodation groove; a strip-shaped clamping groove communicating with the second strip-shaped sliding hole is formed in the accommodation groove of the mounting jig; and the second adjustment member is slidably clamped with the strip-shaped sliding hole.

Further, an end, away from the second adjustment member, of the locating post is sleeved with a locating cap.

The utility model has the following beneficial effects:

First, when the telescopic baby safety door barrier is mounted necessarily, only the mounting portion is adhered to a wall by the double faced adhesive tape, holes are then punched through the connecting hole, and screws are then mounted, thereby being very convenient in mounting.

Second, the double faced adhesive tape can be conveniently adhered to the mounting portion through the auxiliary mounting device, and thus both the mounting accuracy and the mounting speed of the double faced adhesive tape can be improved.

BRIEF DESCRIPTION OF THE DRAWINGS

In order to describe the technical solutions in the embodiments of the utility model more clearly, a simple introduction on the accompanying drawings which are needed in the description of the embodiments or prior art is given below. Apparently, the accompanying drawings in the description below are merely some of the embodiments of the utility model, based on which other drawings may be obtained by those of ordinary skill in the art without any creative effort.

Figure 1:
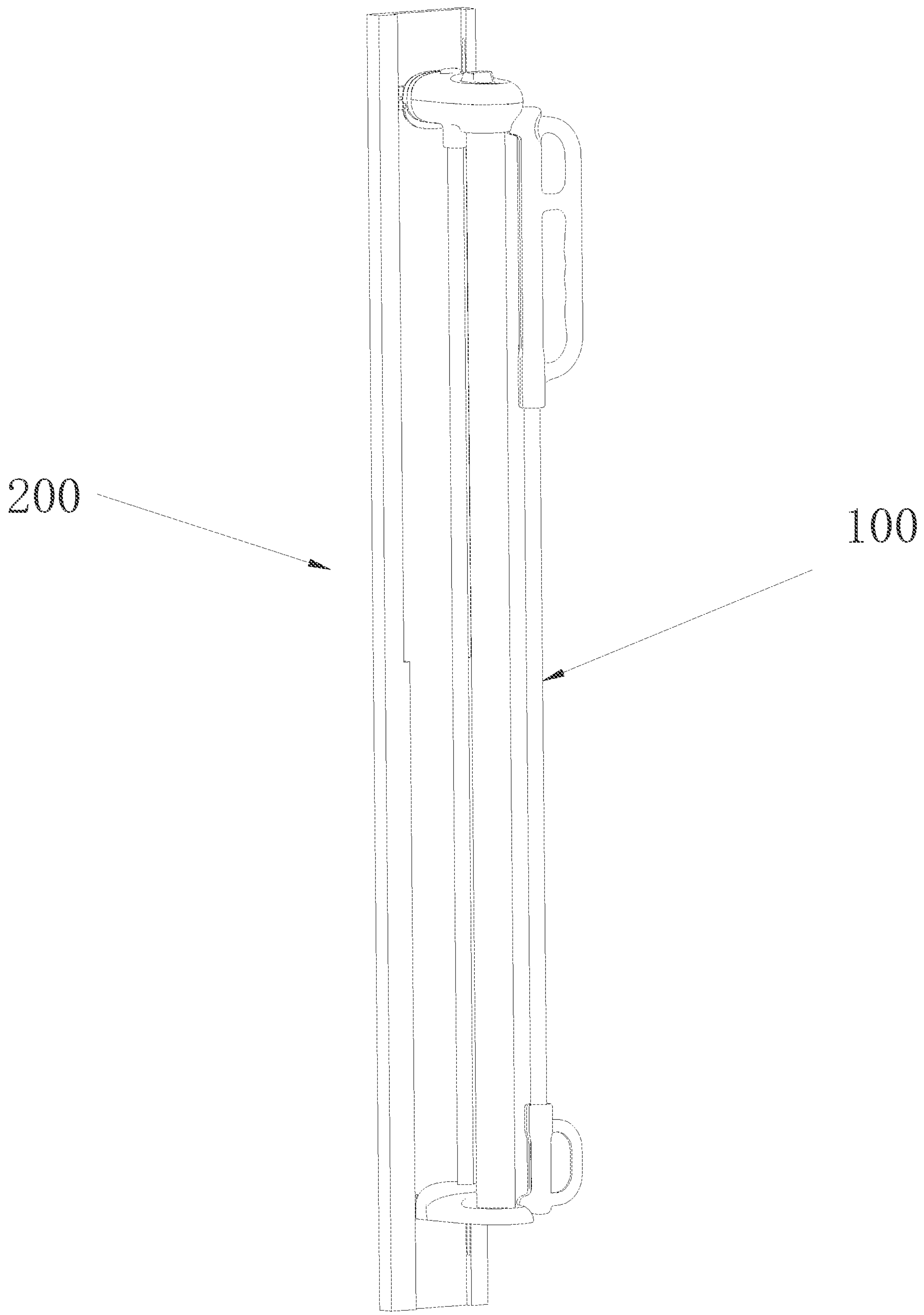
FIG. 1 is a connection schematic diagram of a telescopic baby safety door barrier and an auxiliary mounting device according to the utility model.

There is a guiding ramp (121) provided at one end of the delimiting bracket (12) In the figures: 100, telescopic baby safety door barrier, 11. mounting portion, 12. connecting hole, 13, doorpost, 13*a*. doorpost opening, 14. telescopic barrier, 14*a*. end of the telescopic barrier 15, connecting buckle, 16. double faced adhesive tape, 17. through hole, 18, anti-adhesion layer, 200. auxiliary mounting device, 20, base. 21, sliding groove, 22. first strip-shaped sliding hole, 30. mounting jig, 31. second strip-shaped sliding hole, 32, locating post, 33. accommodation groove, 34, strip-shaped clamping groove, 40. first adjustment assembly, 41. adjustment rod, 42. lock member, 50. second adjustment assembly, 51. first adjustment member, 52. second adjustment member, and 53. locating cap.

DETAILED DESCRIPTION OF THE EMBODIMENTS

All technical and scientific terms used herein have the same meaning as commonly understood by a person skilled in the art to which the utility model belongs, unless otherwise defined. Terms used in the description are merely for the purpose of describing the specific embodiment rather than limiting the utility model, for example, orientations or positions indicated by the terms "length", "width", "upper", "lower", "left", "right", "front", "rear", "vertical", "horizontal", "top", "bottom", "inner" and "outer" are orientations or positions shown based on the accompanying drawings and cannot be understood as limits to the technical solution.

The terms "comprise", "include" and "have" or any other variations thereof in the description, claims and brief description of the drawings of the utility model are intended to cover a non-exclusive inclusion. The terms such as "first" and "second" in the description, claims and accompanying drawings of the utility model are only used to distinguish different objects, rather than to describe a special order. "A plurality of" means two or more, unless otherwise explicitly and specifically defined.

In the description, claims and brief description of the drawings of the utility model, when the element is called as being "fixed on" or "mounted on" or "disposed on" or "connected to" another element, it may be directly or indirectly located on the another element. For example, when the element is called as being "connected to" another element, it may be directly or indirectly connected to the another element.

In addition, reference herein to the "embodiment" means that a particular feature, structure, or characteristic described in connection with the embodiment can be included in at least one embodiment of the utility model. The appearances of the phrase in various places in the specification are not necessarily all referring to the same embodiment, nor are separate or alternative embodiments mutually exclusive of other embodiments. It is explicitly and implicitly to be understood by the person skilled in the art that the described embodiment may be combined with other embodiments.

Embodiment

The embodiment relates to a telescopic baby safety door barrier 100 and an auxiliary mounting device 200.

Figure 2:
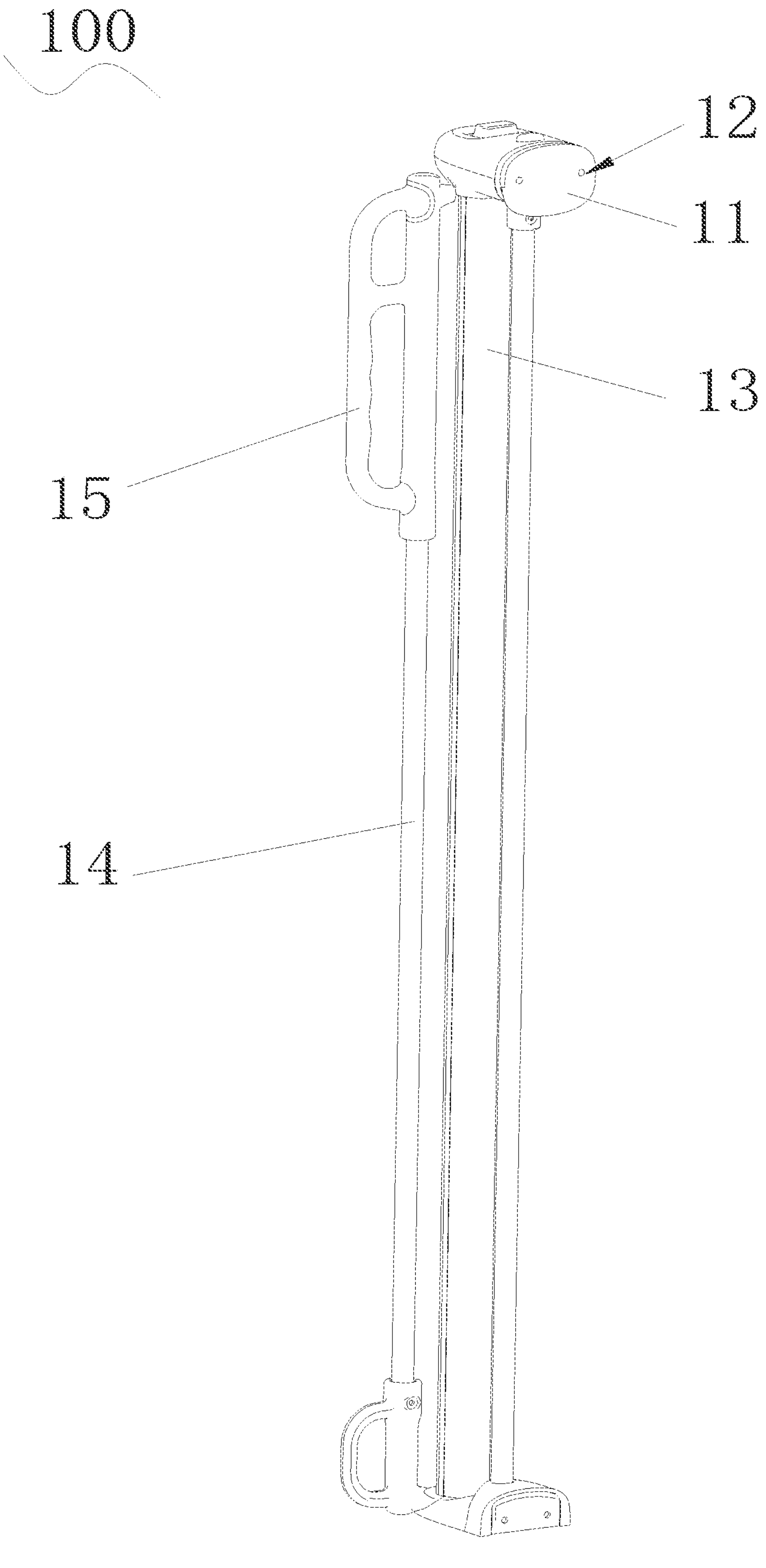
FIG. 2 is a structural schematic diagram of a telescopic baby safety door barrier in FIG. 1.
Figure 3:
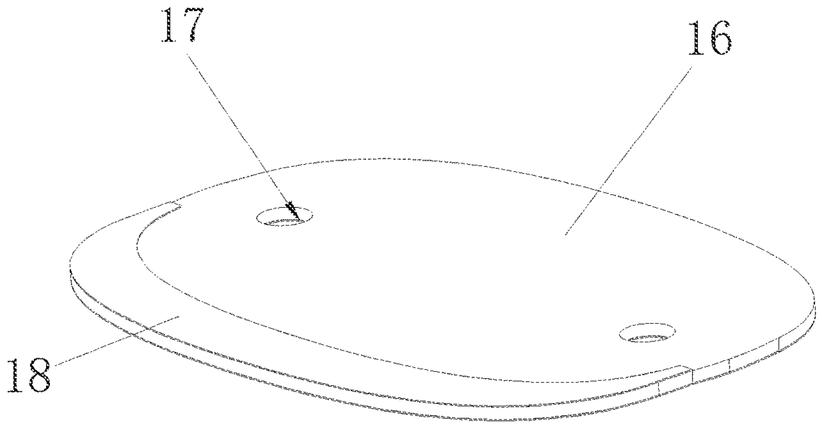
FIG. 3 is a structural schematic diagram of a double faced adhesive tape according to the utility model.

As shown in FIG. 1 to FIG. 3, the telescopic baby safety door barrier 100 provided by the utility model includes a door barrier main body; the door barrier main body is provided with a mounting portion 11; a connecting hole 12 is formed in the mounting portion 11; and the mounting portion 11 is provided with a double faced adhesive tape 16. When the telescopic baby safety door barrier 100 is mounted necessarily, only the mounting portion 11 is adhered to a wall by the double faced adhesive tape 16, holes are then punched through the connecting hole 12, and screws are then mounted, thereby being very convenient in mounting.

Figure 6:
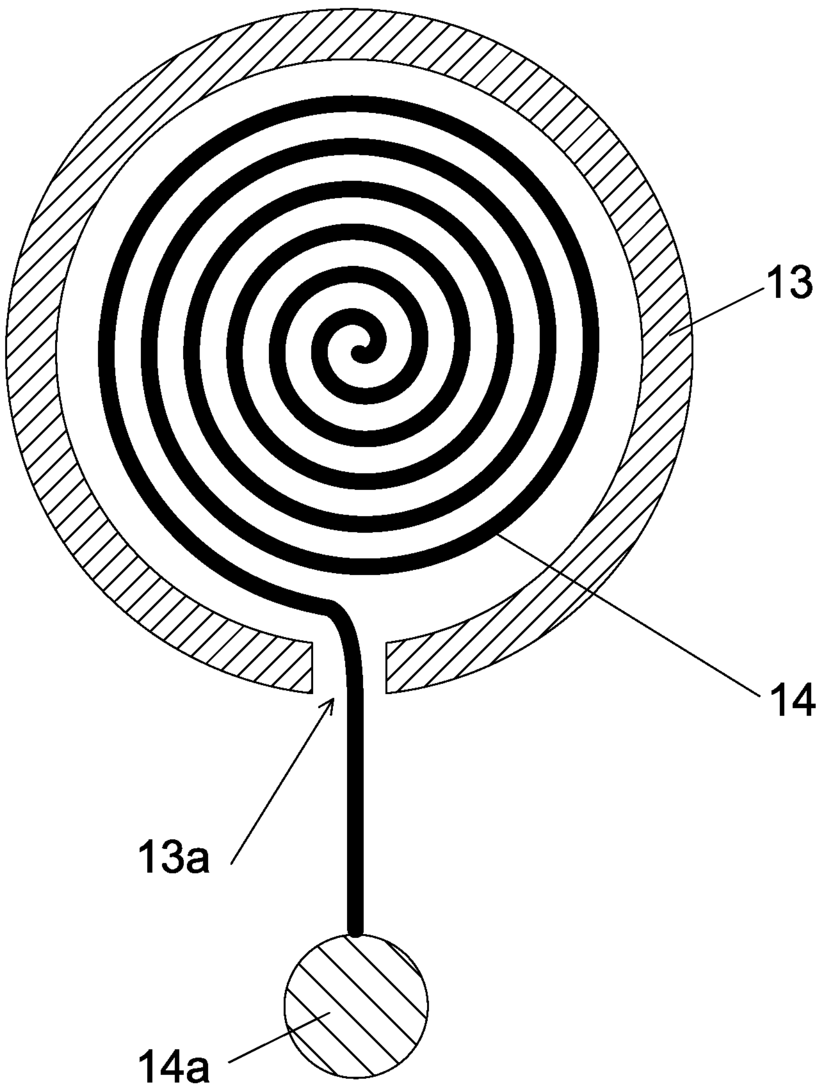
FIG. 6 is a high-level diagram of a cross-sectional view of the door post of FIG. 1.

As shown in FIGS. 2 and 6, the door barrier main body includes a hollow doorpost 13 and a telescopic barrier 14 disposed in the doorpost 13; the doorpost 13 is provided with an opening 13*a*; and one end 14*a* of the telescopic barrier 14 is protruded out of the opening. Specifically, an end, away from the doorpost 13, of the telescopic barrier 14 is provided with a connecting buckle 15.

As shown in FIG. 3, a through hole 17 is formed in the double faced adhesive tape 16, and when the double faced adhesive tape 16 is connected to the mounting portion 11, the through hole 17 is opposite to the connecting hole 12; and an anti-adhesion layer 18 is adhered at an outer side of the double faced adhesive tape 16.

Figure 4:
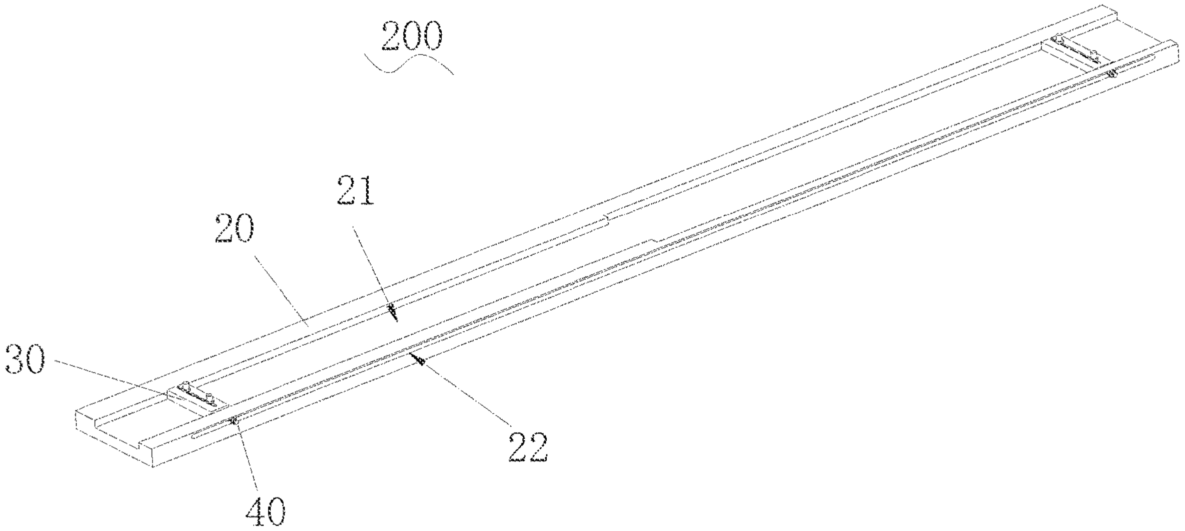
FIG. 4 is a structural schematic diagram of an auxiliary mounting device in FIG. 1.
Figure 5:
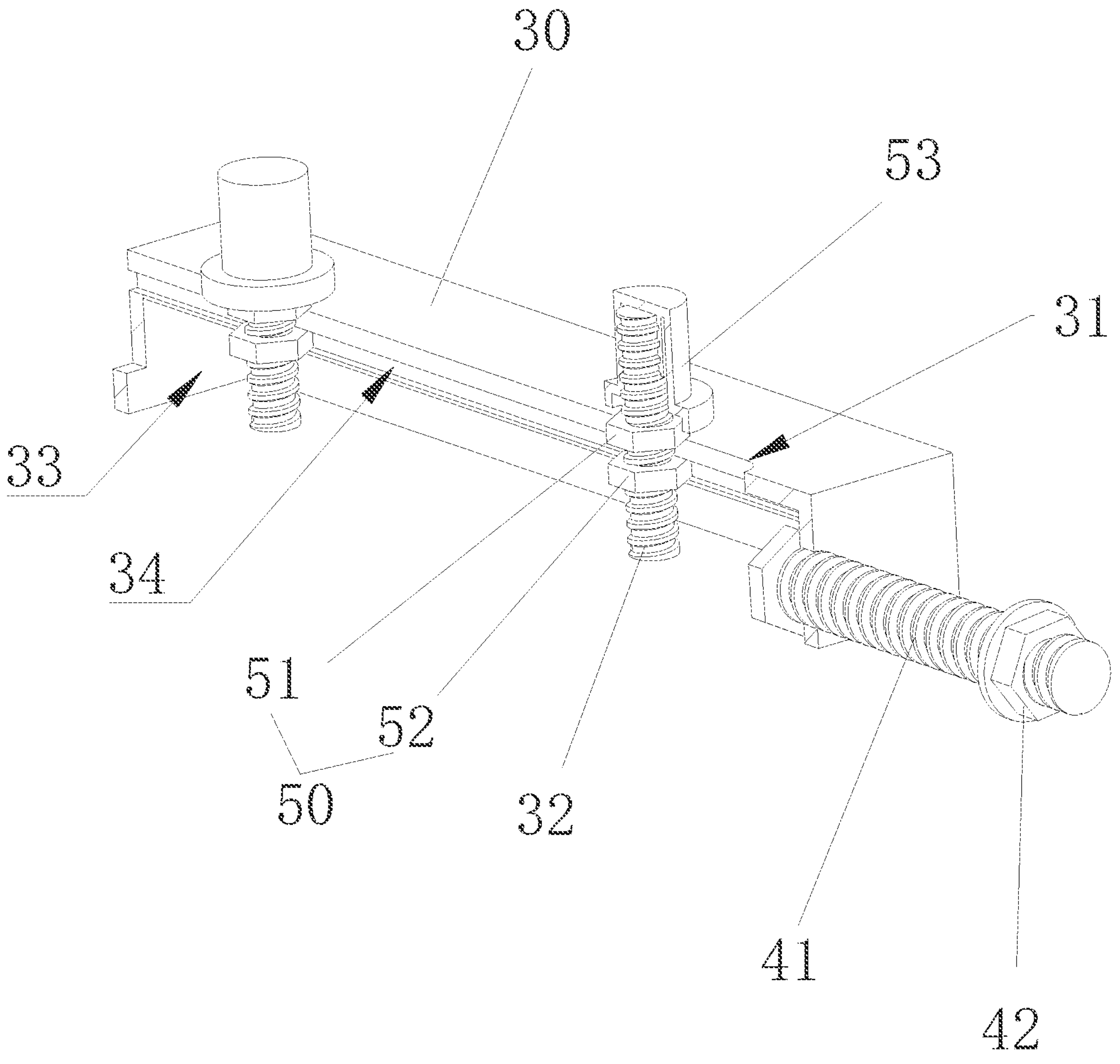
FIG. 5 is a sectional view of a mounting jig in FIG. 4.

As shown in FIG. 1, FIG. 4 and FIG. 5, the auxiliary mounting device 200 includes:

a base 20, provided with a sliding groove 21; and a mounting jig 30, slidably disposed in the sliding groove 21.

A first adjustment assembly 40 for fixing the mounting jig 30 is disposed between the mounting jig 30 and the base 20.

In the embodiment, two mounting jigs 30 are arranged on the base 20. The distance between the two mounting jigs 30 may be adjusted, such that the mounting jig 30 is in one-to-one correspondence with the mounting portion 11 of the door barrier main body. The mounting jig 30 is fixed by the first adjustment assembly 40 upon the completion of adjustment. The mounting jig 30 is configured to place the double faced adhesive tape 16. The double faced adhesive tape 16 may be conveniently adhered on the mounting portion 11 by the mounting jig 30, and thus both the mounting accuracy and the mounting speed of the double faced adhesive tape 16 may be improved.

As shown in FIG. 5, the base 20 is provided with a first strip-shaped sliding hole 22; the first strip-shaped sliding hole 22 communicates with the sliding groove 21; the first adjustment assembly 40 includes an adjustment rod 41 and a lock member 42; one end of the adjustment rod 41 is connected to the mounting jig 30, and the other end of the adjustment rod 41 is protruded out of the first strip-shaped sliding hole 22; the adjustment rod 41 is in sliding fit with the first strip-shaped sliding hole 22; the lock member 42 is in threaded connection with the adjustment rod 41; and by rotating the lock member 42, the lock member 42 can be abutted against the base 20. Specifically, the adjustment rod 41 is a threaded rod, and the lock member 42 is a screw cap. The mounting jig 30 is fixed simply and conveniently by the adjustment rod 41 and the lock member 42.

In the embodiment, two through holes 17 are formed in the double faced adhesive tape 16. In order to adapt for different types of double faced adhesive tapes 16, at least two locating posts 32 are in sliding fit on the mounting jig 30, and a second adjustment assembly 50 for fixing the locating post 32 is disposed between the locating post 32 and the mounting jig 30. Specifically, the through hole 17 on the double faced adhesive tape 16 is cooperated with the locating post 32 by inserting; and by sliding the locating post 32, and fixing the locating post 32 with the second adjustment assembly 50, different types of double faced adhesive tapes 16 may be conveniently mounted on the mounting jig 30.

In the embodiment, the mounting jig 30 is provided with a second strip-shaped sliding hole 31, and the locating post 32 is slidably disposed in the second strip-shaped sliding hole 31; the second adjustment assembly 50 includes a first adjustment member 51 and a second adjustment member 52 that are in threaded connection with the locating post 32; the first adjustment member 51 and the second adjustment member 52 are respectively located at two sides of the mounting jig 30; and the first adjustment member 51 and the second adjustment member 52 are in abutment fit with the mounting jig 30. Specifically, a side, close to the base 20, of the mounting jig 30 is provided with an accommodation groove 33; the second adjustment member 52 is located in the accommodation groove 33; a strip-shaped clamping groove 34 communicating with the second strip-shaped sliding hole 31 is formed in the accommodation groove 33 of the mounting jig 30; and the second adjustment member 52 is slidably clamped with the strip-shaped sliding hole. In the embodiment, the locating post 32 is a threaded rod, and both the first adjustment member 51 and the second adjustment member 52 are a nut. The distance between the two locating posts 32 and the height that the locating post 32 is protruded out of the mounting jig 30 may be adjusted by the first adjustment member 51 and the second adjustment member 52, thereby adapting for different types of double faced adhesive tapes 16.

In the embodiment, in order to adapt for the size of the through hole 17 on different double faced adhesive tapes 16, an end, away from the second adjustment member 52, of the locating post 32 is sleeved with a locating cap 53.

The above embodiment is the preferred embodiment of the utility model. Besides, the utility model may further be implemented in other manners, and any apparent displacement made without departing from the concept of the technical solutions falls within the scope of protection of the utility model.

What is claimed is:

1. A telescopic baby safety door barrier comprising a door barrier main body and an auxiliary mounting device, the door barrier main body comprising a hollow door post and a telescopic door barrier disposed in the hollow doorpost, the auxiliary mounting device comprising:

a base, wherein the base consists of an elongated bottom plate and two opposite elongated side plates with a sliding groove therebetween;

a mounting jig, wherein the mounting jig is slidably disposed in the sliding groove; and a first adjustment assembly disposed between the mounting jig and the base in order to fix the mounting jig, wherein the first adjustment assembly is distinct from the mounting jig and is configured to fix the mounting jig to the base and wherein at least a portion of the first adjustment assembly is disposed in the sliding groove;

wherein one of the two opposite elongated side plates of the base is provided with a first elongated sliding hole; the first elongated sliding hole communicates with the sliding groove; the first adjustment assembly comprises an adjustment rod and a lock member; a first end of the adjustment rod is connected to the mounting jig, and a second end of the adjustment rod is protruded out of the first elongated sliding hole;

at least two locating posts are in sliding fit on the mounting jig, and a second adjustment assembly for fixing the at least two locating posts is disposed between the at least two locating posts and the mounting jig;

a top surface of the mounting jig is parallel to the elongated bottom plate of the base and the top surface parallel to the elongated bottom plate of the base is provided with a second elongated sliding hole, and each of the at least two locating posts is slidably disposed in the second elongated sliding hole;

wherein directions of the first elongated sliding hole and the second elongated sliding hole are perpendicular to each other, and parallel to the elongated bottom plate of the base.

2. The telescopic baby safety door barrier according to claim 1, wherein the adjustment rod is in sliding fit with the first elongated sliding hole; the lock member is in threaded connection with the adjustment rod; and by rotating the lock member, the lock member is abutted against the base.

3. The telescopic baby safety door barrier auxiliary mounting device according to claim 2, wherein the second adjustment assembly comprises a first adjustment member and a second adjustment member in threaded connection with the at least two locating posts; the first adjustment member and the second adjustment member are respectively located at two sides of the mounting jig; and the first adjustment member and the second adjustment member are in abutment fit with the mounting jig.

4. The telescopic baby safety door barrier according to claim 3, wherein a side, close to the base, of the mounting jig is provided with an accommodation groove; the second adjustment member is located in the accommodation groove; an elongated clamping groove communicating with the second elongated sliding hole is formed in the accommodation groove of the mounting jig; and the second adjustment member is slidably clamped with the second elongated sliding hole.

5. The telescopic baby safety door barrier according to claim 4, wherein an end, away from the second adjustment member, of the at least two locating posts is sleeved with a locating cap.

6. The telescopic baby safety door barrier according to claim 1, wherein the door barrier main body is provided with a mounting portion; a connecting hole is formed in the mounting portion; and the mounting portion is provided with a double faced adhesive tape.

7. The telescopic baby safety door barrier according to claim 6, wherein the hollow doorpost is provided with an opening; and a first end of the telescopic barrier is protruded out of the opening.

8. The telescopic baby safety door barrier according to claim 7, wherein the first end, which is disposed away from the hollow doorpost, of the telescopic barrier is provided with a connecting buckle.

9. The telescopic baby safety door barrier according to claim 8, wherein a through hole is formed in the double faced adhesive tape, and when the double faced adhesive tape is connected to the mounting portion, the through hole is opposite to the connecting hole; and an anti-adhesion layer is adhered at an outer side of the double faced adhesive tape and wherein the anti-adhesion layer is sized to cover only a part of a first face of the double faced adhesive tape, wherein said part is smaller than a totality of a size of said first face of the double faced adhesive tape.

* * * * *